United States Patent
Kameyama et al.

(10) Patent No.: US 12,535,367 B2
(45) Date of Patent: Jan. 27, 2026

(54) SEMICONDUCTOR DEVICE AND TEMPERATURE CHARACTERISTIC TEST METHOD THEREOF

(71) Applicant: RENESAS ELECTRONICS CORPORATION, Tokyo (JP)

(72) Inventors: Tadashi Kameyama, Tokyo (JP); Fumiki Kawakami, Tokyo (JP); Tetsuhiro Koyama, Tokyo (JP); Masataka Minami, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 388 days.

(21) Appl. No.: 18/353,255

(22) Filed: Jul. 17, 2023

(65) Prior Publication Data
US 2024/0094064 A1 Mar. 21, 2024

(30) Foreign Application Priority Data
Sep. 16, 2022 (JP) ................. 2022-147537

(51) Int. Cl.
| | |
|---|---|
| *G01K 7/01* | (2006.01) |
| *G01K 7/16* | (2006.01) |
| *G01K 13/00* | (2021.01) |
| *G01K 15/00* | (2006.01) |
| *G05F 3/30* | (2006.01) |
| *G06F 1/26* | (2006.01) |
| *H01L 23/34* | (2006.01) |
| *G06F 1/20* | (2006.01) |

(52) U.S. Cl.
CPC ............ *G01K 13/00* (2013.01); *G01K 7/01* (2013.01); *G01K 7/16* (2013.01); *G01K 15/005* (2013.01); *G01K 2219/00* (2013.01); *G05F 3/30* (2013.01); *G06F 1/206* (2013.01); *H01L 23/34* (2013.01)

(58) Field of Classification Search
CPC ...... G01K 7/01; G01K 15/005; G01K 15/007; G01K 7/16; G01K 13/00; G01K 2219/00; G06F 1/206; G01R 31/2874; G05F 3/30; H01L 23/34
See application file for complete search history.

(56) References Cited

U.S. PATENT DOCUMENTS

| | | | |
|---|---|---|---|
| 10,408,687 B2 | 9/2019 | Ikeda et al. | |
| 10,642,305 B2* | 5/2020 | Lee | ............ G05F 3/265 |
| 11,573,134 B2* | 2/2023 | Kameyama | ............ G01K 7/01 |

(Continued)

FOREIGN PATENT DOCUMENTS

| | | |
|---|---|---|
| JP | 2017-198523 A | 11/2017 |
| JP | 2020-106362 A | 7/2020 |

*Primary Examiner* — Randy W Gibson
(74) *Attorney, Agent, or Firm* — Rimon P.C.

(57) ABSTRACT

Before a temperature characteristic of a band gap reference circuit is tested, temperature dependencies of a reference voltage and an absolute temperature proportional voltage for a plurality of samples are measured. When the temperature characteristic is tested, based on a difference ΔVref between the reference voltage of the band gap reference circuit at a predetermined temperature and a median value of the reference voltages of the plurality of samples, a difference ΔVptat between the absolute temperature proportional voltage of the band gap reference circuit at a predetermined temperature and a median value of the absolute temperature proportional voltages of the plurality of samples is calculated.

6 Claims, 16 Drawing Sheets

(56) References Cited

U.S. PATENT DOCUMENTS

2017/0328790 A1\* 11/2017 Bach .................... G01K 15/002
2020/0209075 A1 7/2020 Kameyama et al.
2022/0236119 A1\* 7/2022 van Veldhoven .... G01K 15/005

\* cited by examiner

SEMICONDUCTOR DEVICE AND TEMPERATURE CHARACTERISTIC TEST METHOD THEREOF

CROSS-REFERENCE TO RELATED APPLICATIONS

The disclosure of Japanese Patent Application No. 2022-147537 filed on Sep. 16, 2022, including the specification, drawings and abstract is incorporated herein by reference in its entirety.

BACKGROUND

The present disclosure relates to a semiconductor device and a temperature characteristic test method, for example, to a semiconductor device comprising a band gap reference (BGR) circuit and a temperature characteristic test method for the semiconductor device.

Recently, information processing devices having a navigation function, an audio function, etc., as vehicle-mounted electronic systems, are mounted on vehicles. Semiconductor devices used in such vehicle-mounted electronic systems require a high safety level in compliance with ISO(International Standard Organization) 26262.

Therefore, the semiconductor device used in the vehicle-mounted electronic system has a temperature sensor for monitoring an internal temperature of the semiconductor device in order to realize high-speed processing in a guaranteed operating temperature range (for example, −40° C. to 125° C.)

There are disclosed techniques listed below.
[Patent Document 1] Japanese Unexamined Patent Application Publication No. 2017-198523
[Patent Document 2] Japanese Unexamined Patent Application Publication No. 2020-106362

Patent Documents 1 and 2 disclose a semiconductor device having a BGR circuit as a temperature sensor.

The BGR circuit has variations in temperature characteristics based on, for example, manufacturing variations. Therefore, when manufacturing the semiconductor device, the temperature characteristics of the BGR circuit in each semiconductor device is tested so that the temperature can be accurately measured in the range of guaranteed operating temperature.

For example, a semiconductor wafer on which a large number of IC (Integrated Circuit) chips being semiconductor devices are formed is fixed on a temperature adjustable wafer chuck, and a temperature of the wafer chuck is set to a lower limit temperature and an upper limit temperature of operation guarantee range for the semiconductor device. At each set temperature, by contacting a probe of a probe card to the semiconductor wafer, the operation of each of the semiconductor device is tested and the temperature characteristic of the BGR circuit in each of the semiconductor devices is tested.

SUMMARY

The inventors found the following problems with regard to the semiconductor device having the band gap reference circuit.

In the above test, it has been considered that a measuring temperature of each semiconductor device on the semiconductor wafer (the temperature when testing the temperature characteristics by contacting the probe) is within an error of, for example, about ±1° C. with respect to the set temperature of the wafer chuck.

However, as a result of investigation, the inventors found that the measuring temperature of the semiconductor device on the semiconductor wafer would deviate from the set temperature of the wafer chuck by, for example up to 10° C.

Specifically, when the set temperature of the wafer chuck is 125° C., the measuring temperature of the semiconductor device was found to be about 115° C. On the other hand, when the set temperature of the wafer chuck is −40° C., the measuring temperature of the semiconductor device was found to be about −30° C. The heat is transferred from the wafer chuck to the semiconductor device through the probe (not particularly limited, for example, about several thousands of probes) in contact with the semiconductor device, and various factors may cause the instability in the amount of heat transferred from the wafer chuck to the semiconductor device.

Here, at the time of test, various factors make it difficult to match the temperature of the probe to the set temperature of the wafer chuck. Therefore, in an environment in which the measuring temperature of the semiconductor device is not accurately known, test of the temperature characteristics of the band gap reference circuit requires higher accuracy.

The cause of the variation in the measuring temperature of the semiconductor device is not limited to a specific cause, but various causes other than heat transfer through the probe in contact with the semiconductor device are conceivable. The present disclosure is also not limited to semiconductor devices used in vehicle-mounted electronic systems.

Other objects and novel features will become apparent from the description of this specification and the accompanying drawings.

According to one embodiment, before a temperature characteristic of a band gap reference circuit is tested, temperature dependencies of a reference voltage and a absolute temperature proportional voltage for a plurality of samples are measured. When the temperature characteristic is tested, based on a difference between a median value of the reference voltage of the band gap reference circuit at a predetermined temperature and the reference voltage of the plurality of samples, a difference between the absolute temperature proportional voltage of the band gap reference circuit at a predetermined temperature and the median value of the absolute temperature proportional voltages of the plurality of samples is calculated.

According to the one embodiment, in an environment in which the measuring temperature of the semiconductor device is not accurately known, a semiconductor device capable of more accurately testing the temperature characteristics of the band gap reference circuit can be realized.

BRIEF DESCRIPTION OF THE DRAWINGS

FIG. 4 is a graph showing simulated result for variations in the reference voltage Vref1 based on manufacturing variations or the like.

FIG. 5 is a graph showing simulated result for variations in the temperature dependency of the absolute temperature proportional voltage Vptat1 based on the manufacturing variations or the like.

DETAILED DESCRIPTION

Figure 1:
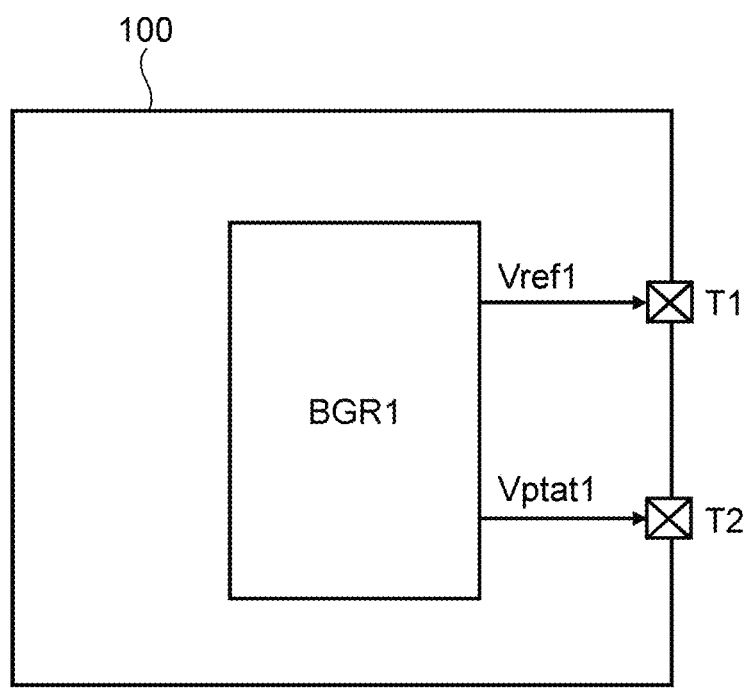
FIG. 1 is a block diagram of a semiconductor device according to a first embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Accordingly, those skilled in the art will understand that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

First Embodiment (Structure of Semiconductor Device)

First, referring to FIG. 1, a semiconductor device according to a first embodiment is explained. FIG. 1 is a block diagram of a semiconductor device 100 according to the first embodiment.

As shown in FIG. 1, the semiconductor device 100 according to the first embodiment is, for example, an IC chip, and has a band gap reference circuit BGR1. As shown in FIG. 1, the band gap reference circuit BGR1 outputs a reference voltage Vref1 and an absolute temperature proportional voltage Vptat1.

The reference voltage Vref1 is constant with respect to a temperature at a predetermined temperature range. Here, constant, as a matter of course, has a certain tolerance, it is not necessary to be completely constant. The reference voltage Vref1 is an analog voltage signal, and is outputted to the outside of the semiconductor device 100 via an external terminal T1.

On the other hand, the absolute temperature proportional voltage Vptat1 is proportional to the absolute temperature. The absolute temperature proportional voltage Vptat1 is an analog voltage signal, and is outputted to the outside of the semiconductor device 100 via an external terminal T2.

Thus, the band gap reference circuit BGR1 is a reference voltage generating circuit for generating a constant reference voltage Vref1 with respect to temperature. Furthermore, the band gap reference circuit BGR1 generates the absolute temperature proportional voltage Vptat1, and has a function as a temperature sensor capable of detecting the temperature.

Figure 2:
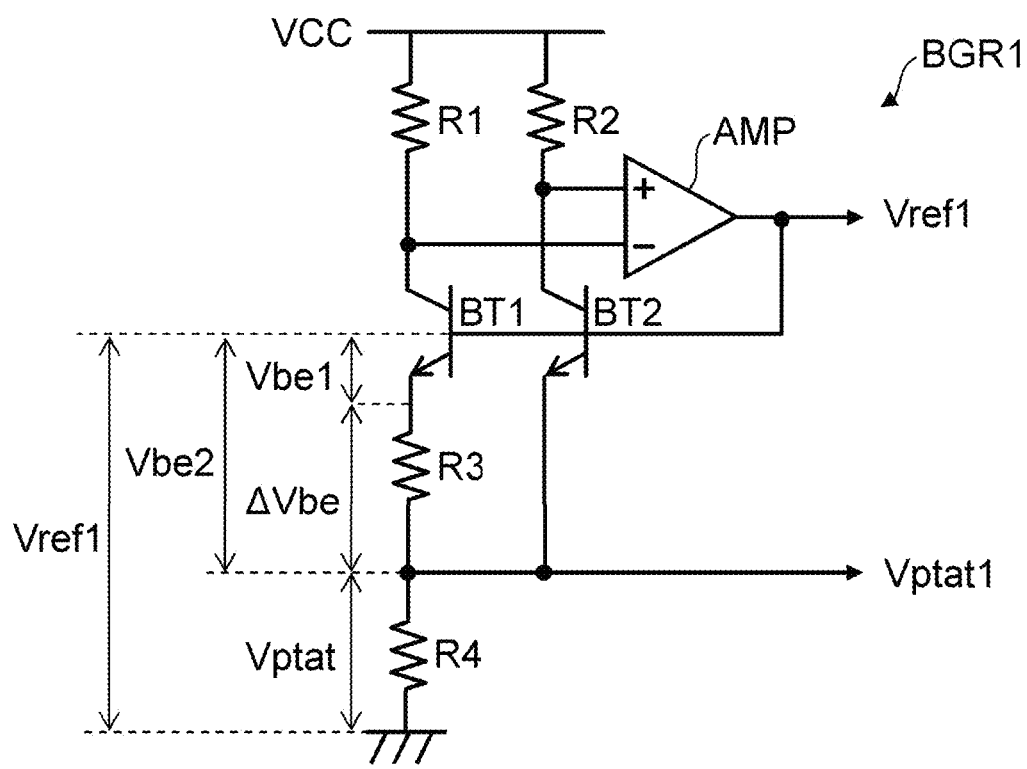
FIG. 2 is a circuit diagram showing an exemplary circuit configuration of a band gap reference circuit BGR1.

Here, FIG. 2 is a circuit diagram showing an exemplary circuit configuration of the band gap reference circuit BGR1. The band gap reference circuit BGR1 shown in FIG. 2 is called a Brokow cell.

The band gap reference circuit BGR1 shown in FIG. 2 has resistors R1 to R4, bipolar transistors BT1 and BT2, and an amplifier AMP.

As shown in FIG. 2, one end of each of the resistors R1 and R2 is connected to a power supply VCC. The resistances of the resistors R1 and R2 are equal. The other end of the resistor R1 is connected to the collector of the bipolar transistor BT1, and the other end of the resistor R2 is connected to the collector of the bipolar transistor BT2. An emitter of the bipolar transistor BT1 is connected to one end of the resistor R3. The other end of the resistor R3 is connected to one end of the resistor R4. An emitter of the bipolar transistor BT2 is connected to the node between the resistor R3 and the resistor R4. The other end of the resistor R4 is grounded.

As shown in FIG. 2, an inverting (−) input terminal of the amplifier AMP is connected to the node between the resistor R1 and the collector of the bipolar transistor BT1. On the other hand, a non-inverting (+) input terminal of the amplifier AMP is connected to the node between the resistor R2 and the collector of the bipolar transistor BT2.

The output terminal of the amplifier AMP outputs the reference voltage Vref1 and is commonly connected to the bases of the bipolar transistors BT1 and BT2. The negative feedback loop of the amplifier AMP controls the collector current of the bipolar transistors BT1 and BT2 to be equal.

An analog buffer circuit such as a voltage follower may be provided between the output terminal of the amplifier AMP and the external terminal T1 for outputting the reference voltage Vref1 to the outside.

As shown in FIG. 2, the voltage across the resistor R4 is the absolute temperature proportional voltage Vptat1, and is outputted from the node between the resistor R3 and the resistor R4.

An analog buffer circuit such as a voltage follower may be provided between the node between the resistor R3 and the resistor R4 and the external terminal T2 for outputting the absolute temperature proportional voltage Vptat1 to the outside.

In FIG. 2, the relation between the reference voltage Vref1 and the absolute temperature proportional voltage Vptat1 is shown. As shown in FIG. 2, when the base-emitter voltage of the bipolar transistor BT2 is Vbe2, Vref1=Vbe2+Vptat1 is held.

Incidentally, when the base-emitter voltage of the bipolar transistor BT1 is Vbe1, a difference ΔVbe of the base-emitter voltages Vbe1, Vbe2 of the bipolar transistors BT1, BT2 is expressed by ΔVbe=Vbe2−Vbe1. As shown in FIG. 2, ΔVbe is equal to the voltage across the resistor R3.

The circuit shown in FIG. 2 is just an example of the configuration of the band gap reference circuit BGR1. The configuration of the band gap reference circuit BGR1 is not limited to the circuit shown in FIG. 2 as long as the band gap reference circuit BGR1 outputs the constant reference voltage Vref1 with respect to temperature at a predetermined temperature range and outputs the absolute temperature proportional voltage Vptat1 proportional to the absolute temperature.

Figure 3:
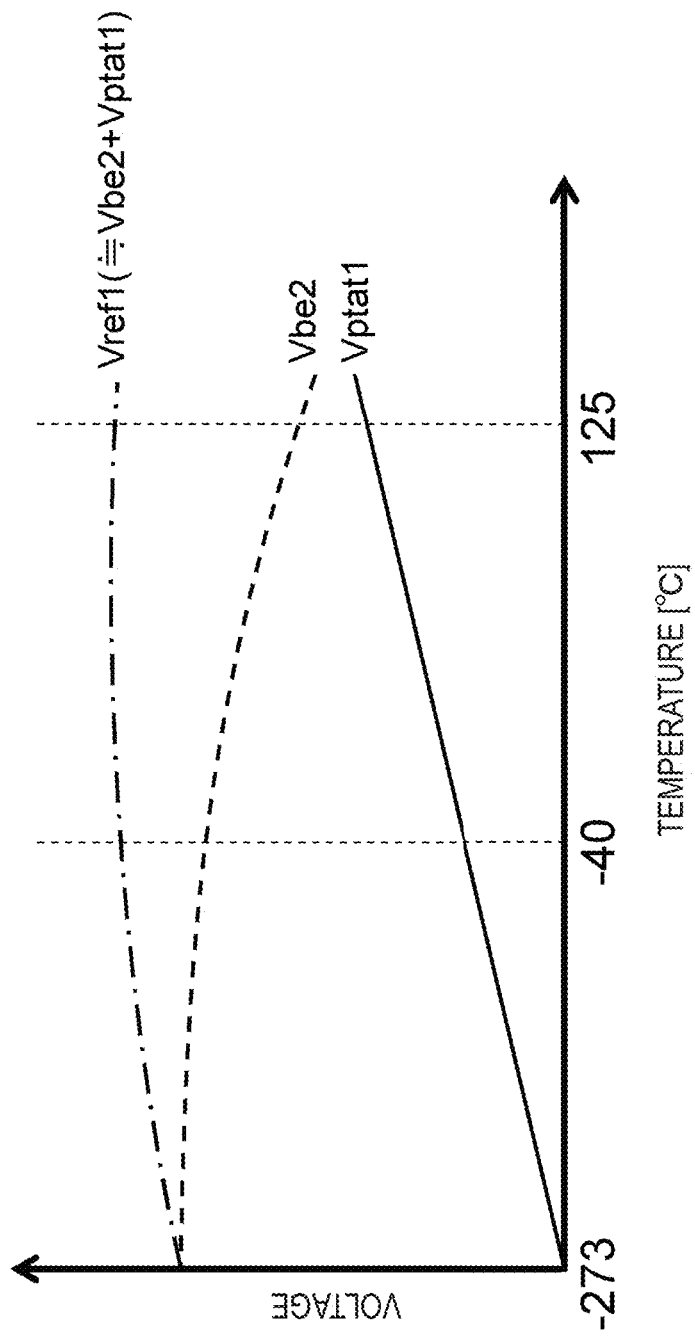
FIG. 3 is a graph showing a reference voltage Vref1, an absolute temperature proportional voltage Vptat1, and a temperature dependency of a base-to-emitter voltage Vbe2 of a bipolar transistor BT2, shown in FIG. 2.

Here, FIG. 3 is a graph showing the temperature dependencies of the reference voltage Vref1, the absolute temperature proportional voltage Vptat1, and the base-emitter voltage Vbe2 of the bipolar transistor BT2. In FIG. 3, the horizontal axis indicates the temperature (° C.), and the vertical axis indicates the voltage. As shown in FIGS. 2 and 3, Vref1≈Vbe2+Vptat1 is held.

When the collector current of the bipolar transistor BT1 and the collector current of the bipolar transistor BT2 are set to match each other, Vref1=Vbe2+Vptat1 is held, but in some cases, the collector current of the bipolar transistor BT1 and the collector current of the bipolar transistor BT2 are intentionally set to be shifted from each other due to the circuit-design. Therefore, in FIG. 3, it is described as Vref1≈Vbe2+Vptat1.

As shown in FIG. 3, the absolute temperature proportional voltage Vptat1 has a positive temperature dependency. On the other hand, the base-emitter voltage Vbe2 of the bipolar transistor BT2 has a negative temperature dependency. The absolute temperature proportional voltage Vptat1 and the base-emitter voltage Vbe2 of the bipolar transistor BT2 cancel out each other allowing the constant reference voltage Vref1 for temperature at a predetermined temperature range to be obtained. For example, such a reference voltage Vref1 is obtained in the band gap reference circuit BGR1 shown in FIG. 2 by adjusting the ratio of the resistors R3, R4 and the transistor ratio of the bipolar transistors BT1, BT2 or the like.

The predetermined temperature range is, for example, the range of guaranteed operating temperature for the semiconductor device 100 (for example, −40 to 125° C.)

As described above, the band gap reference circuit BGR1 has a variation in temperature characteristics, for example, based on manufacturing variations. Therefore, when manufacturing the semiconductor device 100, the temperature characteristics of the BGR circuit in each semiconductor device is tested so that the temperature can be accurately measured in the range of the guaranteed operating temperature.

In the semiconductor device 100 according to the present embodiment, before the temperature characteristic of the band gap reference circuit BGR1 is tested, the temperature dependency of the reference voltage Vref1 and the absolute temperature proportional voltage Vptat1 are measured in advance for a plurality of samples. For example, each sample is put in a constant temperature chamber, at a temperature error of ±1° C. or less, and the reference voltage Vref1 and the absolute temperature proportional voltage Vptat1 at each temperature are measured. The number of samples is, for example, 100 or more. More specifically, the number of samples is about hundreds to thousands.

Figure 4:
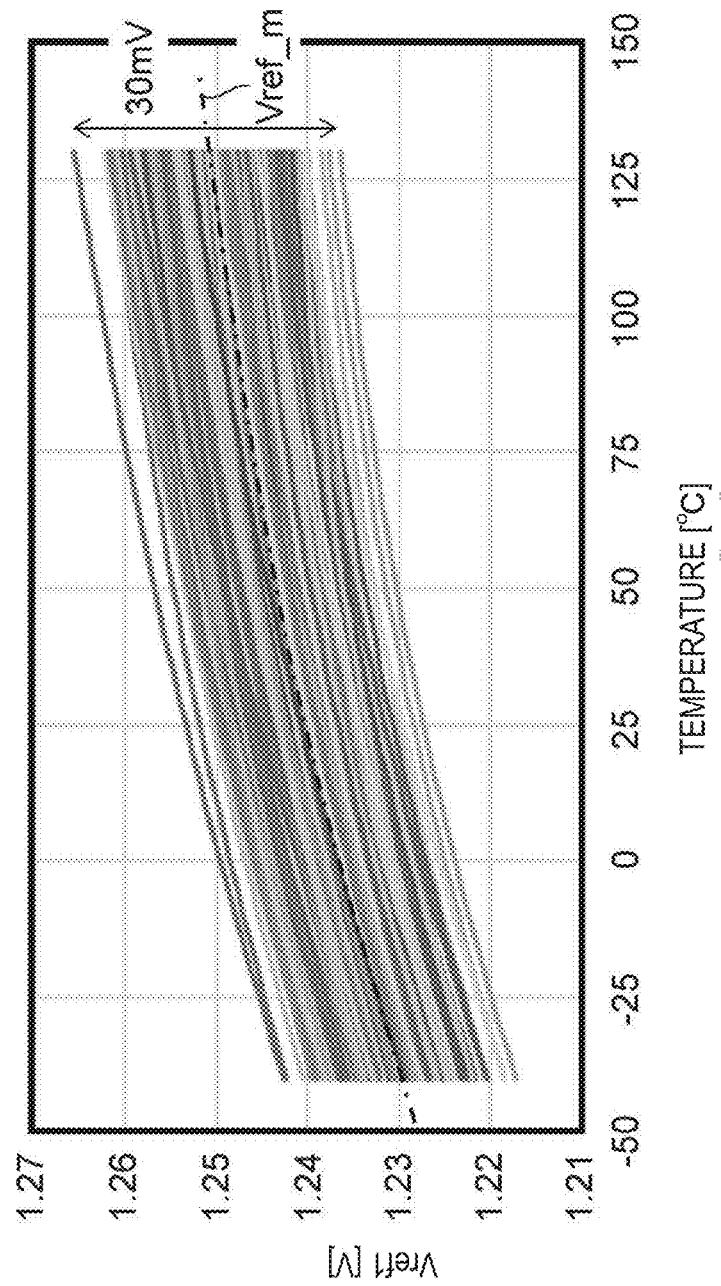

Here, FIG. 4 is a graph showing simulated results for variations in temperature-dependency of the reference voltage Vref1 based on manufacturing variations or the like. In FIG. 4, the horizontal axis indicates the temperature (° C.), and the vertical axis indicates the reference voltage Vref1 (V). In FIG. 4, the median value Vref_m of the reference voltages Vref1 for all the samples is also shown by a chain line.

As shown in FIG. 4, from −40 to 125° C., the median value Vref_m of the reference voltages is about 1.23 to 1.25V and increases about 20 mV (0.02V) as the temperature increases. Further, as shown in FIG. 4, the width of variation the reference voltage Vref1 at −40 to 125° C. is substantially constant with about 30 mV (0.03V).

Figure 5:
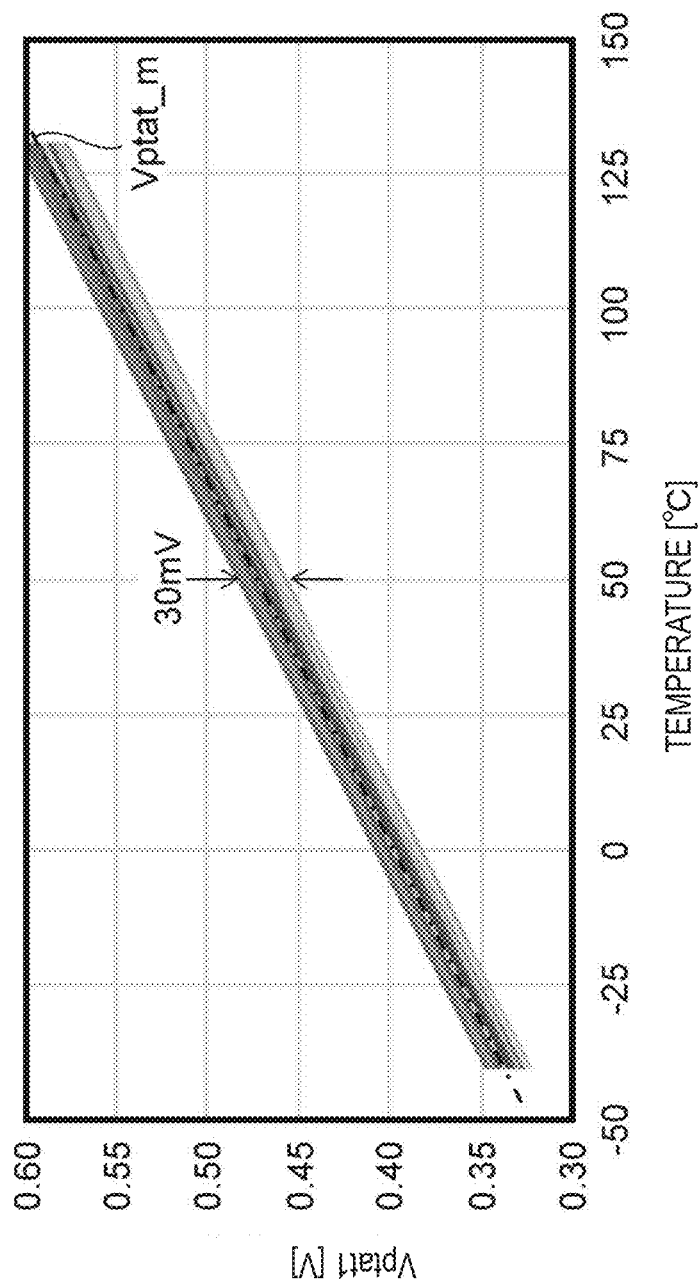

FIG. 5 is a graph showing a simulated result for variations in the temperature dependency of the absolute temperature proportional voltage Vptat1 based on the manufacturing variation or the like. In FIG. 5, the horizontal axis indicates the temperature (° C.), and the vertical axis indicates the absolute temperature proportional voltage Vptat1 (V). In FIG. 5, the median value Vref_m of the absolute temperature proportional voltage Vptat1 of all the samples is also shown by a chain line.

As shown in FIG. 5, from −40 to 125° C., the absolute temperature proportional voltage Vptat1 has a slope of about 1.3 to 1.6 mV/° C., and a linearity with respect to temperature. Further, as shown in FIG. 5, the width of variation in the absolute temperature proportional voltage Vptat1 from −40 to 125° C. is also substantially constant with about 30 mV (0.03V).

Here, each of FIGS. 4 and 5 focuses on the curves and straight lines of a certain sample. ΔVref1 is a difference between the reference voltage Vref1 of the sample at a certain temperature and the median value Vref_m of the reference voltages of all samples. Further, ΔVptat1 is a difference between the absolute temperature proportional voltage Vptat1 of the sample at the certain temperature and the median value Vptat_m of the absolute temperature proportional voltages of all the samples.

The inventors found that the ratio ΔVptat1/ΔVref1 is substantially constant regardless of temperature, and becomes substantially the same value regardless of the sample.

In this specification, the median value includes not only the median value in the exact definition but also the average value. In addition, the variations in the reference voltage Vref1 and the absolute temperature proportional voltage Vptat1 are normally distributed, so that the average value and the median value in the exact definition approximately match with each other.

In the semiconductor device 100 according to the present embodiment, by utilizing the variation characteristics of such a reference voltage Vref1 and the absolute temperature proportional voltage Vptat1, the temperature characteristic of the band gap reference circuit BGR1 is tested. Specifically, the temperature characteristic of the band gap reference circuit is tested by calculating ΔVptat1 indicating the temperature characteristic based on ΔVref1 with little change in temperature.

Therefore, in the semiconductor device 100 according to the present embodiment, even in an environment in which the tested temperature of the semiconductor device 100 is not accurately known, it is possible to more accurately test the temperature characteristic of the band gap reference circuit BGR1.

A method for testing the temperature characteristic of the band gap reference circuit BGR1 will be described below.
(Method for Testing Temperature Characteristic)

Next, referring to FIGS. 6 and 7, the method for testing the temperature characteristics of the band gap reference circuit BGR1 will be described.

Figure 6:
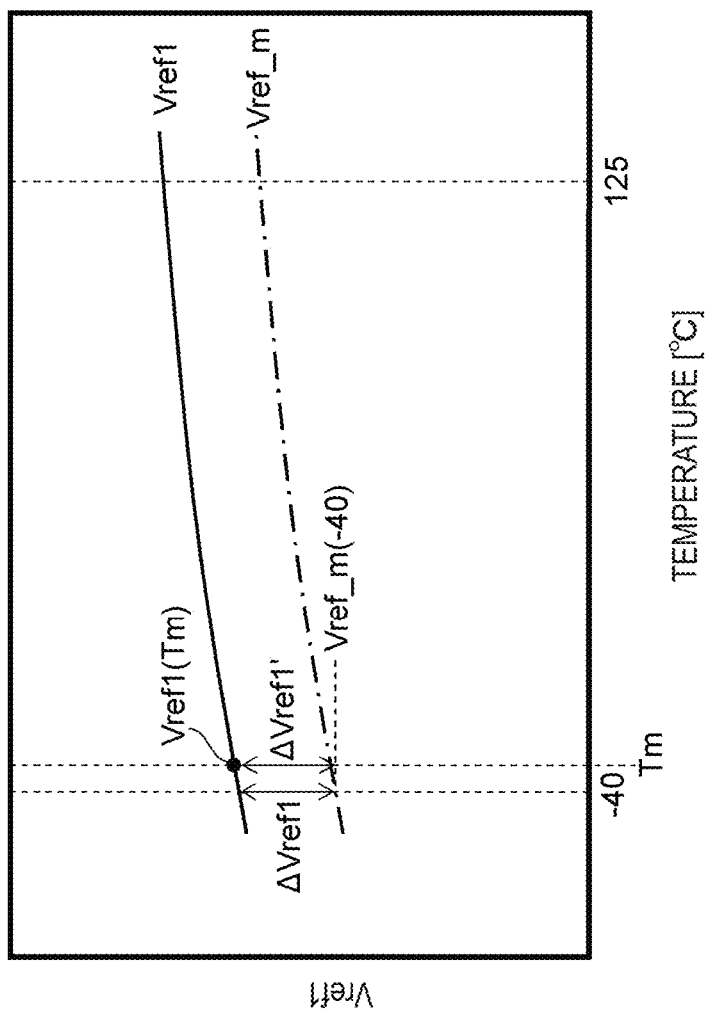
FIG. 6 is a graph showing the temperature dependency of the reference voltage Vref1.

FIG. 6 is a graph showing the temperature dependency of the reference voltage Vref1. In FIG. 6, the horizontal axis indicates the temperature T (° C.), and the vertical axis indicates the reference voltage Vref1 (V). In FIG. 6, the reference voltage Vref1 of the band gap reference circuit BGR1 to be tested is shown by a solid line, and the median value Vref_m of the reference voltages of the plurality of samples measured in advance is shown by a chain line.

Figure 7:
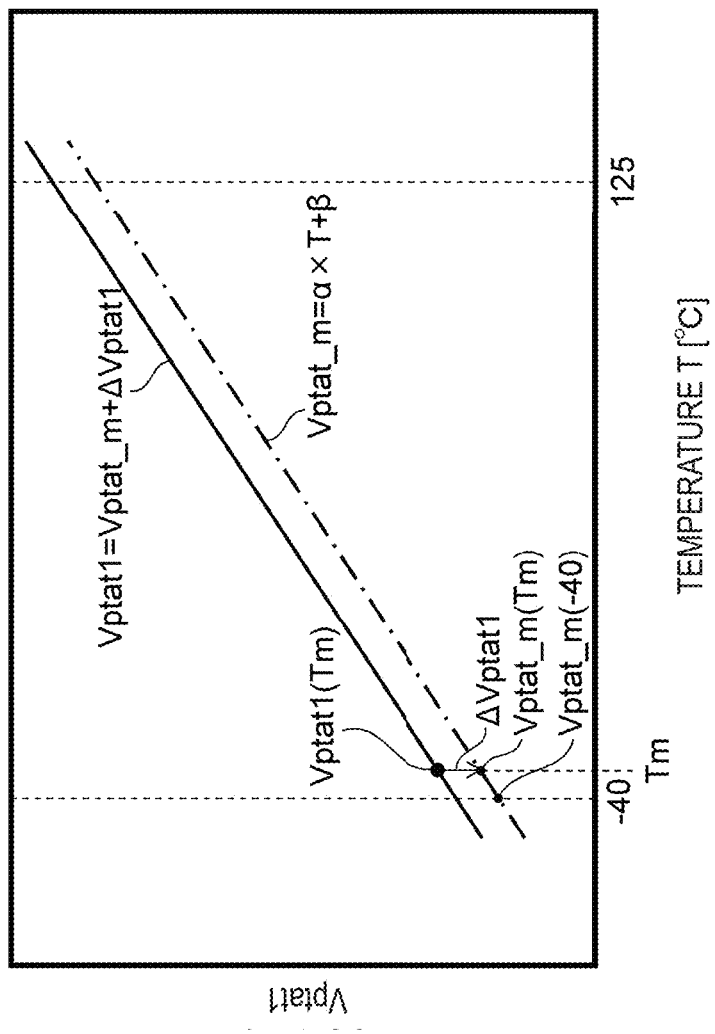
FIG. 7 is a graph showing the temperature dependency of the absolute temperature proportional voltage Vptat1.

FIG. 7 is a graph showing the temperature dependency of the absolute temperature proportional voltage Vptat1. In FIG. 7, the horizontal axis indicates temperature T (° C.), and the vertical axis indicates the absolute temperature proportional voltage Vptat1 (V). In FIG. 7, the absolute temperature proportional voltage Vptat1 of the band gap reference circuit BGR1 to be tested is shown by a solid line, and the median value Vptat_m of the absolute temperature proportional voltages of the plurality of samples measured in advance is shown by a chain line.

FIGS. 6 and 7 show the reference voltage Vref1 and the absolute temperature proportional voltage Vptat1 measured, when the test temperature is set to −40° C. as a lower limit of guaranteed operating temperature for the semiconductor device 100.

First, in FIG. 6, although the measuring temperature is set to −40° C., it is assumed that the reference voltage Vref1 (Tm) was measured at the actual measuring temperature Tm(° C.). That is, the measuring temperature Tm(° C.) is near −40° C., but the actual measuring temperature Tm(° C.) is unknown. As shown in FIG. 6, the actual measuring temperature Tm (° C.) is likely to become higher than −40° C., for example, about −30° C.

As shown in FIG. 6, the reference voltage Vref1 and the median value Vref_m of the reference voltages are substantially constant with respect to temperature. Therefore, the median value Vref_m (−40) of the reference voltages at −40° C. is substantially the same value as the median value Vref_m of the reference voltages at the measuring temperature Tm(° C.). Therefore, the difference ΔVref1 between the reference voltage Vref1 and the median value Vref_m of the reference voltages is substantially equal to a difference ΔVref1' between the reference voltage Vref1(Tm) at the measuring temperature Tm (° C.) and the median value Vref_m (−40) of the reference voltages at measuring temperature −40° C. Also referring to FIG. 3, the change in the reference voltages Vref1 at −40° C. and Tm (° C.) is negligibly small compared to the change in the absolute temperature proportional voltage Vptat1.

That is, since the calculated ΔVref1'≈ΔVref1 holds, the calculated ΔVref1' is assumed to ΔVref1.

Next, as shown in FIG. 7, the difference ΔVptat1 between the absolute temperature proportional voltage Vptat1(Tm) at the measuring temperature Tm(° C.) and the median value Vptat_m of the absolute temperature proportional voltages is calculated by using the above-described relationship that ΔVptat1/ΔVref1 is constant. For example, if ΔVptat1/ΔVref1=1.0, then ΔVptat1=ΔVref1.

The calculated ΔVptat1 is an eigenvalue showing the temperature characteristics of the respective band gap reference circuit BGR1.

As also shown in FIG. 7, since the absolute temperature proportional voltage Vptat1 Vptat1=Vptat_m+ΔVptat1 is held, the temperature characteristic expression of the absolute temperature proportional voltage Vptat1 is obtained by substituting the calculated ΔVptat1.

Specifically, as described later, the calculated ΔVptat1 is converted to a digital signal, for example, and stored in a storage unit such as a fuse bit in the controller for controlling the band gap reference circuit BGR1.

Further, as shown in FIG. 7, the median value Vptat_m (Tm) of the absolute temperature proportional voltage at the measuring temperature Tm (° C.) is obtained by subtracting ΔVptat1 calculated from the absolute temperature proportional voltage Vptat1(Tm) at the measuring temperature Tm (° C.). Here, as shown in FIG. 7, the median value Vptat_m of the absolute temperature proportional voltage is represented as Vptat_m=α×T+β using the constant α, β, and the expression is known. For example, and the constant α indicating the slope of the straight line is about 1.5 (mV/° C.), the constant β is about 400 (mV).

That is, since Vptat_m(Tm)=α×Tm+β, the measuring temperature Tm (° C.) is obtained from Tm={Vptat_m (Tm)−β}/α. As described above, when testing the temperature characteristic of the band gap reference circuit BGR1, ΔVptat1 indicating the temperature characteristic is calculated using the finding, based on the relationship that ΔVptat1/ΔVref1 is constant found by the inventors, that ΔVref1 has little change with temperature. Then, by using the calculated ΔVptat1, the absolute temperature proportional voltage Vptat1 of the band gap reference circuit BGR1 is corrected.

Here, in FIG. 7, if the difference between the absolute temperature proportional voltage Vptat1(Tm) at the measuring temperature Tm (° C.) and the absolute temperature proportional voltage Vptat1(−40) at the measuring temperature −40° C. is defined as ΔVptat1, the difference becomes larger than the actual value.

In contrast, in the semiconductor device 100 according to the present embodiment, when testing the temperature characteristic ΔVptat1 showing the temperature characteristic is calculated based on ΔVref1 with small change with temperature shown in FIG. 6. Therefore, even in an environment where the tested temperature of the semiconductor device 100 is not accurately known, the temperature characteristic of the band gap reference circuit BGR1 can be tested with higher accuracy.

Subsequently, referring to FIGS. 8 and 9, the method for testing the temperature characteristic of the band gap reference circuit BGR1 will be described.

Figure 8:
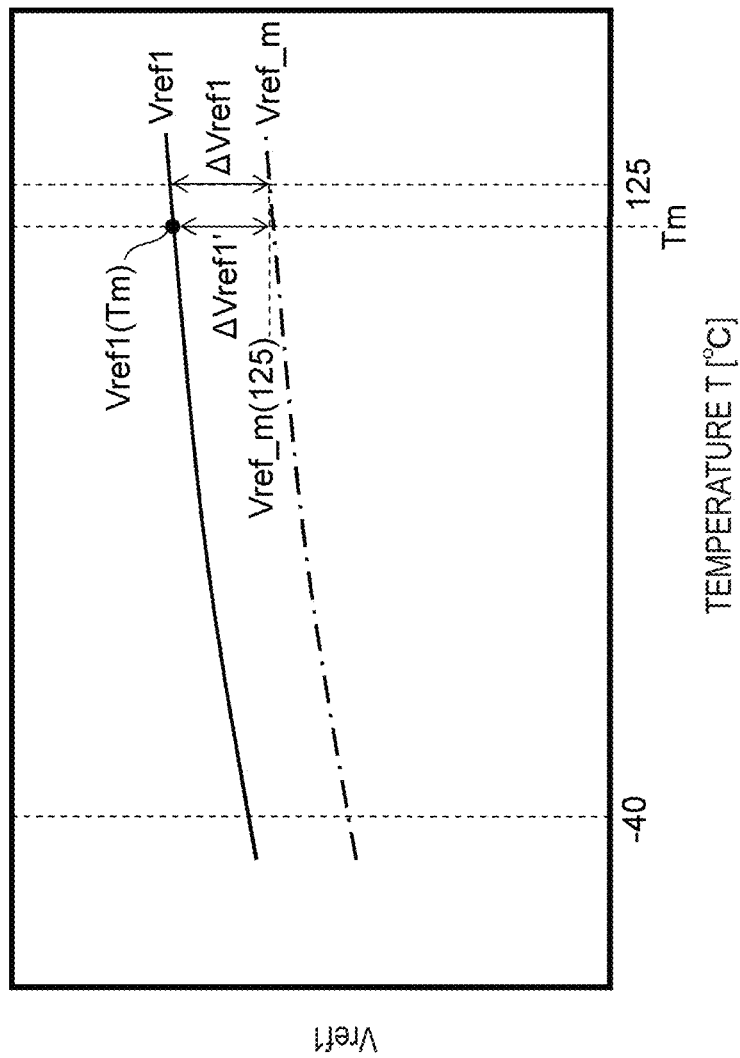
FIG. 8 is a graph showing the temperature dependency of the reference voltage Vref1.

FIG. 8 is a graph showing the temperature dependency of the reference voltage Vref1. FIG. 9 is a graph showing the temperature dependency of the absolute temperature proportional voltage Vptat1. The graphs shown in FIGS. 8 and 9 are the same as the graphs shown in FIGS. 6 and 7, respectively.

Figure 9:
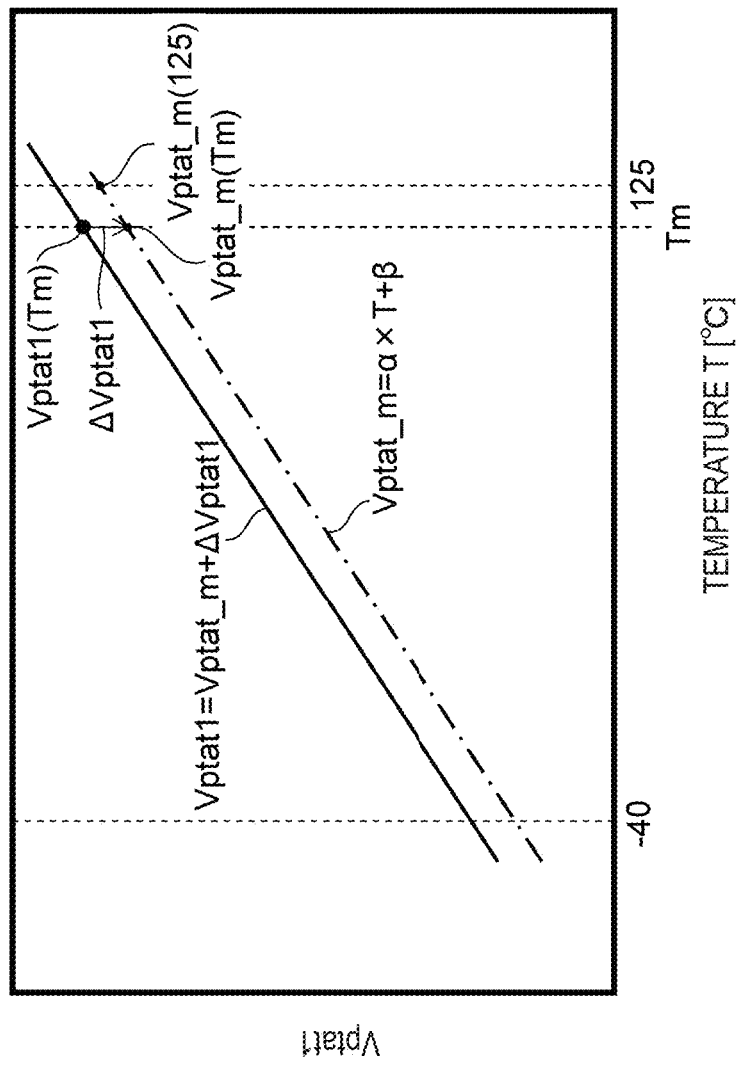
FIG. 9 is a graph showing the temperature dependency of the absolute temperature proportional voltage Vptat1.

However, FIGS. 8 and 9 show the reference voltage Vref1 and the absolute temperature proportional voltage Vptat1 measured when the measuring temperature is set to 125° C. as the upper limit of guaranteed operating temperature for the semiconductor device 100.

First, as shown in FIG. 8, although the measuring temperature is set to 125° C., it is assumed that the reference voltage Vref1(Tm) was measured at the actual measuring temperature Tm (° C.). That is, the measuring temperature Tm (° C.) is near 125° C., but the actual measuring temperature Tm (° C. is unknown. As shown in FIG. 8, the actual measuring temperature Tm (° C.) is likely to become lower than 125° C., for example, about 115° C.

As shown in FIG. 8, the reference voltage Vref1 and the median value Vref_m of the reference voltages are substantially constant with respect to temperature. Therefore, the median value Vref_m (125) of the reference voltage at 125° C. is substantially the same value as the median value Vref_m of the reference voltage at the measuring temperature Tm (° C.). Therefore, the difference ΔVref1 between the reference voltage Vref1 and the median value Vref_m of the reference voltages is substantially equal to the difference ΔVref1' between the reference voltage Vref1(Tm at the measuring temperature Tm (° C.) and the median value Vref_m (125) of the reference voltages at 125° C. Also referring to FIG. 3, the change in Vref1 at 125° C. and Tm (° C.) is negligibly small compared to the change in Vptat1.

That is, since the calculated ΔVref1'≈ΔVref1 holds, the calculated ΔVref1' is assumed to ΔVref1.

Next, as shown in FIG. 9, the difference ΔVptat1 between the absolute temperature proportional voltage Vptat1(Tm) at the measuring temperature Tm (° C.) and the median value Vptat_m of the absolute temperature proportional voltages is calculated using the relationship that ΔVptat1/ΔVref1 is constant. For example, if ΔVptat1/ΔVref1=1.0, then ΔVptat1=ΔVref1.

Calculated ΔVptat1 is an eigenvalue showing the temperature characteristic of the band gap reference circuit BGR1.

As also shown in FIG. 9, since the absolute temperature proportional voltage Vptat1=Vptat_m+ΔVptat1 is held, the temperature characteristic expression of the absolute temperature proportional voltage Vptat1 is also obtained by substituting the calculated ΔVptat1.

Specifically, as described later, the calculated ΔVptat1 is converted to a digital signal, for example, and stored in a storage unit such as a fuse bit in the controller for controlling the band gap reference circuit BGR1.

Further, as shown in FIG. 9, the median value Vptat_m (Tm) of the absolute temperature proportional voltages at the measuring temperature Tm (° C.) is obtained by subtracting ΔVptat1 from the absolute temperature proportional voltage Vptat1(Tm at the measuring temperature (° C.).

As shown in FIG. 9, the median value Vptat_m of the absolute temperature proportional voltages is expressed as Vptat_m=α×T+β using the constants α, β. That is, since Vptat_m (Tm)=α×Tm+β, Tm={Vptat_m(Tm)−β}/α the measuring temperature Tm (° C.) is obtained from Tm={Vptat_m(Tm)−β}/α.

As described above, when testing the temperature characteristic of the band gap reference circuit BGR1, ΔVptat1 indicating the temperature characteristic is calculated using the finding, based on the relationship that ΔVptat1/ΔVref1 is constant found by the inventors, that ΔVref1 has small change with temperature. Then, the calculated ΔVptat1 is used to correct the absolute temperature proportional voltage Vptat1 of the band gap reference circuit BGR1.

Here, in FIG. 9, when the difference between the absolute temperature proportional voltage Vptat1(Tm) at the measuring temperature Tm (° C.) and the absolute temperature proportional voltage Vptat1 (125) at the measuring temperature 125° C. is defined as ΔVptat1, it becomes smaller than the actual value.

In contrast, in the semiconductor device 100 according to the present embodiment, when testing the temperature characteristic, ΔVptat1 showing the temperature characteristic is calculated based on ΔVref1 temperature with small change as shown in FIG. 8. Therefore, even in an environment where the tested temperature is not accurately known, the temperature characteristic of the band gap reference circuit BGR1 can be tested with higher accuracy.

Returning to FIG. 6, when the measuring temperature Tm (° C.) is in the vicinity of −40° C., the measuring temperature Tm (° C.) likely becomes higher than −40° C. In that case, as shown in FIG. 6, the calculated ΔVref1' is larger than the actual ΔVref1. As a result, the calculated value of ΔVptat1 is also larger than the actual value.

On the other hand, returning back to FIG. 8, when the measuring temperature Tm (° C.) is in the vicinity of 125° C., the measuring temperature Tm (° C.) likely becomes lower than 125° C. In that case, as shown in FIG. 8, the calculated ΔVref1' is smaller than the actual ΔVref1. As a result, the calculated value of ΔVptat1 is also smaller than the actual value.

Therefore, when calculating ΔVptat1, it is preferable to use an average of ΔVref1 obtained when the measuring temperatures Tm (° C.) are both in the vicinity of −40° C. and in the vicinity of 125° C. Thus, the calculated value of the difference ΔVref1 between the reference voltage Vref1 and the median value Vref_m of the reference voltages can be made closer to the actual value.

Second Embodiment (Structure of Semiconductor Device)

Figure 10:
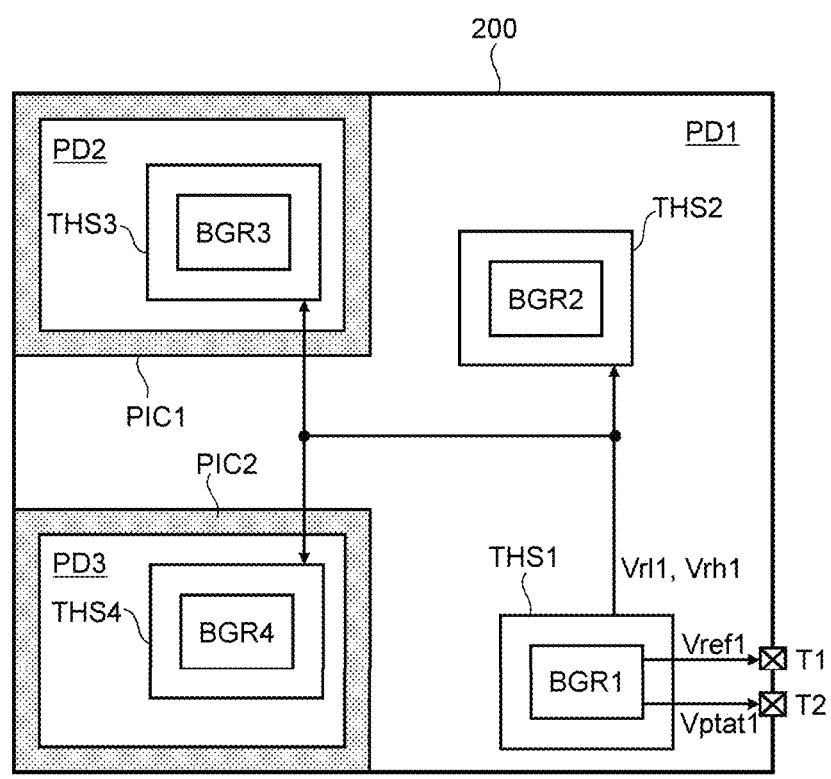
FIG. 10 is a block diagram of a semiconductor device according to a second embodiment.

Next, with reference to FIG. 10, a semiconductor device according to the second embodiment will be described. FIG. 10 is a block diagram of a semiconductor device 200 according to the second embodiment.

As shown in FIG. 10, the semiconductor device 200 according to the second embodiment is, for example, an IC chip, and has temperature sensor modules THS1 to THS4.

As shown in FIG. 10, the temperature sensor module THS1 has the band gap reference circuit BGR1 shown in FIG. 1.

Similar to that of the semiconductor device 100 according to the first embodiment shown in FIG. 1, the band gap reference circuit BGR1 outputs the reference voltage Vref1 to the external terminal T1, and outputs the absolute temperature proportional voltage Vptat1 to the external terminal T2.

As shown in FIG. 10, the temperature sensor modules THS2 to THS4 also include band gap reference circuits BGR2 to BGR4, respectively.

As shown in FIG. 10, the temperature sensor modules THS1 and THS2 are formed in the same power supply area PD1.

The temperature sensor module THS3 is formed in a power supply area PD2. The power supply area PD2 is an area where the power supply voltage differs from the power supply voltage of the power supply area PD1. The power supply area PD2 is surrounded by a power supply isolation cell PICT, and the power supply area PD1 and the power supply are separated.

The temperature sensor module THS4 is formed in a power supply area PD3. The power supply area PD3 is an area where the power supply voltage is shut off at the time of low power consumption mode (for example, sleep mode). The power supply area PD3 is surrounded by a power supply isolation cell PIC2, and the power supply area PD1 and the power supply are separated.

Note that the semiconductor device 200 does not need to include both the power supply areas PD2 and PD3, and only one of the power supply areas PD2, PD3 may be included in the semiconductor device 200.

Furthermore, the number of temperature sensor modules may be a plurality, and is not limited in any way.

Here, the temperature characteristic of the temperature sensor module THS1 is tested by the temperature characteristic test method described in the first embodiment. As shown in FIG. 10, the temperature sensor module THS1 whose temperature characteristic is tested outputs reference voltages Vrl1 and Vrh1. The reference voltages Vrl1 and Vrh1 are inputted to each of the temperature sensor modules THS2 to THS4.

As will be described in more detail below, the reference voltages Vrl1 and Vrh1 are generated from the reference voltage Vref1 in the temperature sensor module THS1 whose temperature characteristic is tested. Each of the temperature sensor modules THS2 to THS4 can test the temperature characteristics of the band gap reference circuits BGR2 to BGR4 based on the reference voltages Vrl1, Vrh1.

(Detailed Circuit Configuration of Semiconductor Device)

Figure 11:
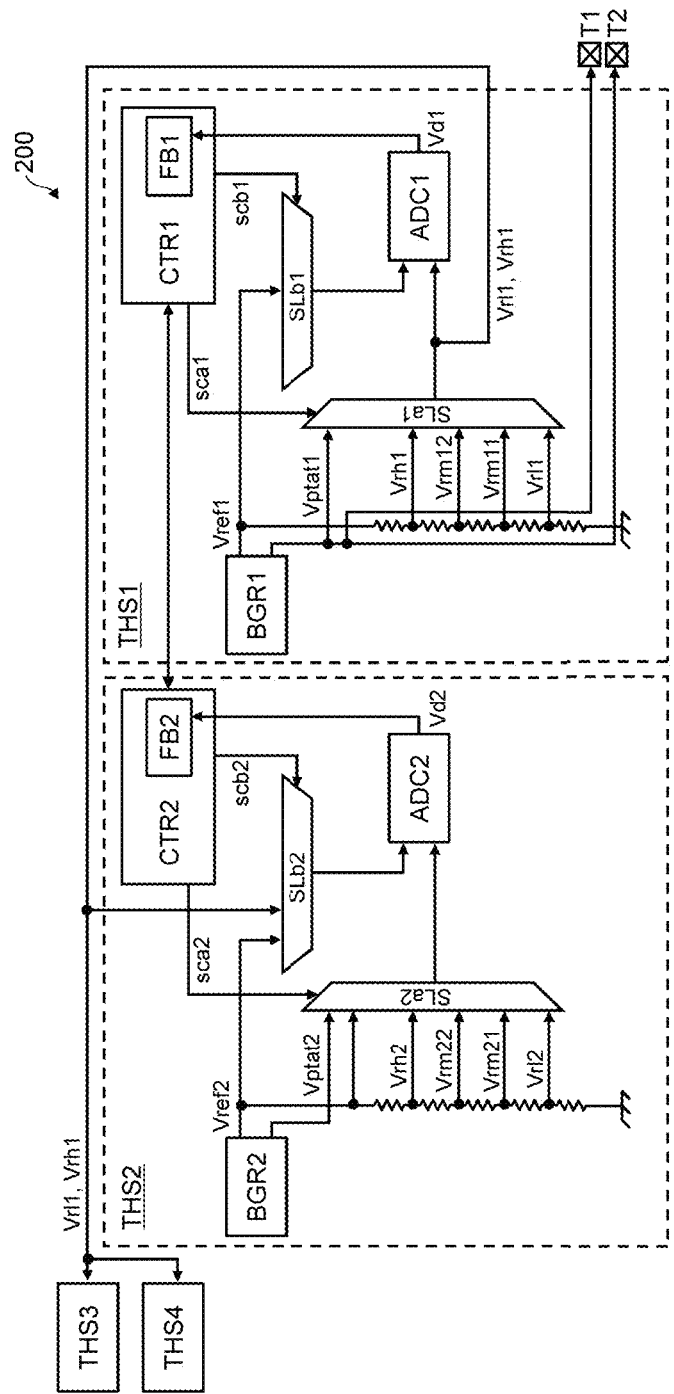
FIG. 11 is a circuit diagram showing an exemplary circuit configuration of temperature sensor modules THS1, THS2.

Next, with reference to FIG. 11, a detailed circuit configuration of the semiconductor device 200 according to the present embodiment will be described. FIG. 11 is a circuit diagram showing an exemplary circuit configuration of the temperature sensor modules THS1, THS2.

First, the temperature sensor module THS1 will be described.

As shown in FIG. 11, the temperature sensor module THS1 has the band gap reference circuit BGR1, selectors SLa1 and SLb1, analog/digital converter (hereinafter A/D converter) ADC1, and a controller CTR1.

The band gap reference circuit BGR1 is the same as the band gap reference circuit BGR1 according to the first embodiment shown in FIGS. 1 and 2. As shown in FIG. 11, the band gap reference circuit BGR1 outputs the reference voltage Vref1 to the external terminal T1, and outputs the absolute temperature proportional voltage Vptat1 to the external terminal T2.

As shown in FIG. 11, a plurality of reference voltages (reference divided voltages) Vrl1, Vrm11, Vrm12, Vrh1 (Vrl1<Vrm11<Vrm12<Vrh1) are generated by dividing the reference voltage Vref1 by the ladder resistor. Here, the reference voltage Vrl1 is the same level voltage as the absolute temperature proportional voltage Vptat1 at the lower limit of operation guarantee temperature for the semiconductor device 200 (for example, −40° C.). The reference voltage Vrh1 is the same level voltage as the absolute temperature proportional voltage Vptat1 at the upper limit of guaranteed operating temperature for the semiconductor device 200 (for example, 125° C.)

The reference voltages Vrm11, Vrm12 (Vrm12>Vrm11) are the same level of the absolute temperature proportional voltage Vptat1 at a predetermined temperature which is lower than the upper limit temperature and higher than the lower limit of the operation guarantee temperature for the semiconductor device 200.

Note that the semiconductor device 200 does not require both the reference voltages Vrm11 and Vrm12. The reference voltages between the reference voltage Vrl1 and the reference voltage Vrh1 are not limited to the reference voltages Vrm11 and Vrm12, and the number of the reference voltages between the reference voltage Vrl1 and the reference voltage Vrh1 may be one or three or more.

As shown in FIG. 11, the absolute temperature proportional voltage Vptat1 and the reference voltages Vrl1, Vrm11, Vrm12 and Vrh1 are inputted to the selector SLa1.

The selector SLa1 selects any one of the input voltage signals based on the selection control signal sca1 outputted from the controller CTR1.

The reference voltage Vref1 is inputted to the selector SLb1. The selector SLb1 selects the reference voltage Vref1 based on the selection control signal scb1 outputted from the controller CTR1.

In FIG. 11, although only the reference voltage Vref1 is inputted to the selector SLb1, in practice, other signals not shown are also inputted. Therefore, the selector SLb1 is included in the semiconductor device 200.

Any one analog voltage signal of the absolute temperature proportional voltage Vptat1 and the reference voltages Vrl1, Vrm11, Vrm12 and Vrh1 is inputted to the A/D converter ADC1 via the selector SLa1.

Further, the reference voltage Vref1 which is an analog voltage signal is inputted to the A/D converter ADC1.

The A/D converter ADC1 converts the voltage signal inputted via the selector SLa1 into a digital voltage signal Vd1 using the reference voltage Vref1 inputted via the selector SLb1 as a reference signal. That is, the digital voltage signal Vd1 includes A/D converted digital signal from the absolute temperature proportional voltage Vptat1 and the reference voltages Vrl1, Vrm11, Vrm12 and Vrh1.

The digital voltage signal Vd1 outputted from the A/D converter ADC1 is stored in a fuse bit FB1 of the controller CTR1.

The controller CTR1 controls the temperature sensor module THS1. Specifically, as shown in FIG. 11, the controller CTR1 outputs the respective selection control signals sca1 and scb1 with respect to the selectors SLa1 and SLb1. Further, the controller CTR1 includes the fuse bit FB1 for storing the digital voltage signal Vd1 outputted from the A/D converter ADC1.

Further, as shown in FIG. 11, the controller CTR1 may be connected to a controller CTR2 of the temperature sensor module THS2. Therefore, the controllers CTR1 and CTR2 may be able to transmit and receive data stored in the fuse bits FB1 and FB2 to each other.

The controller CTR1 may be disposed outside the temperature sensor module THS1. Further, the fuse bit FB1 may be disposed outside the controller CTR1.

Here, the temperature characteristic of the temperature sensor module THS1 is tested by the temperature characteristic test method described in the first embodiment.

As shown in FIG. 11, in the semiconductor device 200 according to the present embodiment, the temperature sensor module THS1 whose temperature characteristic is tested in advance outputs the reference voltages Vrl1 and Vrh1. The reference voltages Vrl1 and Vrh1 are inputted to each of the temperature sensor modules THS2 to THS4. As will be described later in detail, each of the temperature sensor modules THS2 to THS4 can test the temperature characteristics of the band gap reference circuits BGR2 to BGR4 based on the reference voltage Vrl1 and Vrh1.

Next, the temperature sensor module THS2 will be described.

The temperature sensor module THS2 has the same circuit configuration as that of the temperature sensor module THS1. Specifically, the temperature sensor module THS2 has the band gap reference circuit BGR2, selectors SLa2 and SLb2, an A/D converter ADC2, and the controller CTR2.

Incidentally, the temperature sensor modules THS3 and THS4 have the same circuit configuration and operation as the temperature sensor module THS2, so the description thereof will be omitted.

Like the band gap reference circuit BGR1 according to the first embodiment shown in FIGS. 1 and 2, the band gap reference circuit BGR2 also outputs a reference voltage Vref2, and an absolute temperature proportional voltage Vptat2.

On the other hand, as shown in FIG. 11, an external terminal for outputting the reference voltage Vref2 and the absolute temperature proportional voltage Vptat2 outputted from the band gap reference circuit BGR2 to the outside is not included in the semiconductor device 200. Such a configuration can reduce the number of external terminals.

As shown in FIG. 11, a plurality of reference voltages (reference divided voltage) Vrl2, Vrm21, Vrm22 and Vrh2 (Vrl2<Vrm21<Vrm22<Vrh2) obtained by dividing the reference voltage Vref2 by the ladder resistor is generated.

Here, the reference voltage Vrl2 is a voltage of the same level as the absolute temperature proportional voltage Vptat2 at the lower limit of guaranteed operating temperature for the semiconductor device 200 (for example, −40° C.). The reference voltage Vrh2 is the same level as the absolute temperature proportional voltage Vptat2 at the upper limit of operation guarantee temperature for the semiconductor device 200 (for example, 125° C.). The reference voltages Vrm21 and Vrm22 (Vrm22>Vrm21) are the same level as the absolute temperature proportional voltage Vptat2 at a predetermined temperature, which is lower than the upper limit of operation guarantee temperature and higher than the lower limit of operation guarantee temperature for the semiconductor device 200.

As shown in FIG. 11, like the selector SLa1, the absolute temperature proportional voltage Vptat2 and the reference voltages Vrl1, Vrml1, Vrm12 and Vrh1 are inputted to the selector SLa2. Furthermore, the reference voltage Vref2 is also inputted to the selector SLa2.

The selector SLa2 selects any one of the input voltage signals based on the selection control signal sca2 outputted from the controller CTR2.

Like the selector SLb1, the reference voltage Vref1 is inputted to the selector SLb2. Furthermore, the reference voltages Vrl1 and Vrh1 outputted from the temperature sensor module THS1 are also inputted to the selector SLb2.

The selector SLb2 selects any one of the inputted voltage signals based on the selection control signal scb2 outputted from the controller CTR2.

Any one analog voltage signal of the absolute temperature proportional voltage Vptat2 and the reference voltages Vref2, Vrl2, Vrm21, Vrm22 and Vrh2 is inputted to the A/D converter ADC2 via the selector SLa2.

Further, any one analog voltage signal of the reference voltages Vref2, Vrl1 and Vrh1 is inputted to the A/D converter ADC2 via the selector SLb2.

The A/D converter ADC2 converts the absolute temperature proportional voltage Vptat2 and the reference voltages Vrl2, Vrm21, Vrm22 and Vrh2 inputted via the selector SLa2 to the digital voltage signal Vd2 by the reference voltage Vref2 inputted via the selector SLb2 as a reference signal. That is, the digital voltage signal Vd2 includes an A/D converted digital signal from the absolute temperature proportional voltage Vptat2 and the reference voltages Vrl2, Vrm21, Vrm22 and Vrh2.

On the other hand, the A/D converter ADC2 also converts the reference voltage Vrl1 and Vrh1 inputted via the selector SLb2 to the digital voltage signal Vd2 by the reference voltage Vref2 inputted via the selector SLa2 as a reference signal. That is, the digital voltage signal Vd2 also includes an A/D converted digital signal from the reference voltages Vrl1 and Vrh1.

The digital voltage signal Vd2 outputted from the A/D converter ADC2 is stored in the fuse bit FB2 of the controller CTR2.

The controller CTR2 controls the temperature sensor module THS2. Specifically, as shown in FIG. 11, the controller CTR2 outputs selection control signals sca2 and scb2 to the selectors SLa2 and SLb2. Further, the controller CTR2 has the fuse bit FB2 for storing the digital voltage signal Vd2 outputted from the A/D converter ADC2.

Here, the temperature characteristic of the temperature sensor module THS1 is tested by the temperature characteristic test method described in the first embodiment.

As shown in FIG. 11, in the semiconductor device 200 according to the present embodiment, the temperature sensor module THS1 whose temperature characteristic is tested in advance outputs the reference voltages Vrl1 and Vrh1. The reference voltages Vrl1 and Vrh1 are inputted to the temperature sensor module THS2. The temperature sensor module THS2 can test the temperature characteristic of the band gap reference circuit BGR2 based on the reference voltages Vrl1 and Vrh1.

The following describes a method of testing the temperature characteristic of the band gap reference circuit BGR2.

(Method for Testing Temperature Characteristic)

Figure 12:
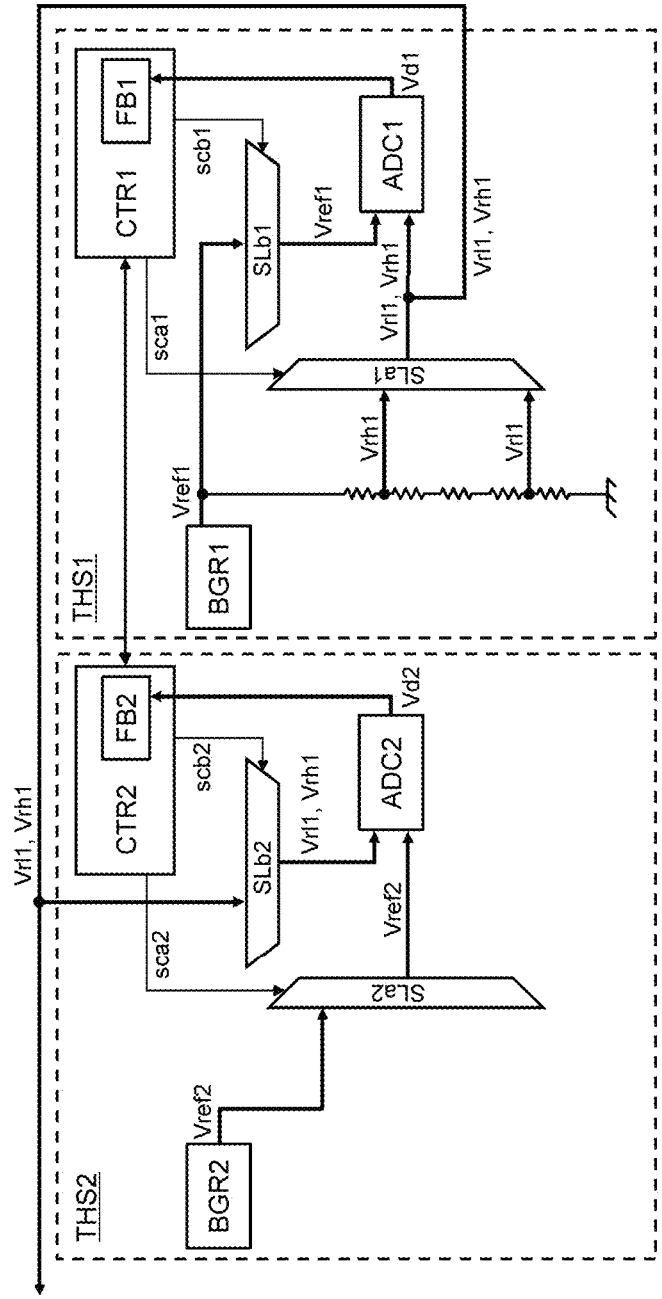
FIG. 12 is a circuit diagram showing an exemplary circuit configuration of the temperature sensor modules THS1, THS2.

Next, referring to FIG. 12, a method for testing the temperature characteristic of the band gap reference circuit BGR2 will be described. FIG. 12 is a circuit diagram showing an exemplary circuit configuration of the temperature sensor modules THS1 and THS2. In FIG. 12, among the signals shown in FIG. 11, only the signals used in testing the temperature characteristic of the band gap reference circuit BGR2 are shown.

First, as shown in FIG. 12, the reference voltages Vrl1 and Vrh1 outputted from the temperature sensor module THS1 whose temperature characteristic is tested in advance are inputted to the temperature sensor module THS2. In the temperature sensor module THS2, the reference voltages Vrl1 and Vrh1 are inputted to the A/D converter ADC2 via the selector SLb2.

In the A/D convertor ADC2, the reference voltages Vrl1 and Vrh1 are converted to the digital voltage signal Vd2 by the reference voltage Vref2 inputted via the selector SLa2 as a reference signal. The digital voltage signal Vd2 is stored in the fuse bit FB2.

Here, the digital voltage signals of the A/D converted reference voltages Vrl1, Vrh1 with the reference voltage Vref2 as reference signals are defined as D_ref2_rl1 and D_ref2_rh1 (not shown).

In the A/D converter ADC1 of the temperature sensor module THS1, the reference voltages Vrl1 and Vrh1 are converted to the digital voltage signals Vd1 by the reference voltage Vref1 inputted via the selector SLb1 as a reference signal. The digital voltage signals Vd1 are stored in the fuse bit FB1.

Here, the digital voltage signals of the A/D converted reference voltages Vrl1, Vrh1 with the reference voltage Vref1 as a reference are defined as D_ref1_rl1 and D_ref1_rh1 (not shown).

Here, referring back to FIG. 6, the difference between the reference voltage Vref1 and the median value Vref_m of the reference voltages is defined as ΔVref1. Similarly, the difference between the reference voltage Vref2 and the median value Vref_m of the reference voltages is defined as ΔVref2.

Since the reference voltage Vrl1 is common between the digital voltage signal D_ref2_rl1 of the reference voltage Vrl1 with reference to the reference voltage Vref2 and the digital voltage signal D_ref1_rl1 of the reference voltage Vrl1 with reference to the reference voltage Vref1, the difference between the digital voltage signal D_ref2_rl1 and the digital voltage signal D_ref1_rl1 holds the following equation (1).

$$D\_ref2\_rl1 - D\_ref1\_rl1 = D\_\Delta ref2 - D\_\Delta ref1 \quad (1)$$

In Equation (1), D_Δref2 is a digital value of ΔVref2, D_Δref1 is a digital value of ΔVref1. That is, the right side of Equation (1) is the digital value of ΔVref2−ΔVref1. Therefore, the following equation (2) holds.

$$\Delta Vref2 - \Delta Vref1 \approx D\_ref2\_rl1 - D\_ref1\_rl1 \quad (2)$$

Since ΔVref1 is known, by deforming equation (2), ΔVref2 can be obtained.

$$\Delta Vref2 \approx D\_ref2\_rl1 - D\_ref1\_rl1 + \Delta Vref1$$

Here, the difference between the absolute temperature proportional voltage Vptat2 outputted from the band gap reference circuit BGR2 and the median value Vptat_m of the absolute temperature proportional voltages is defined as ΔVptat2. As described in the first embodiment, ΔVptat2 can be obtained, as an eigenvalue showing the temperature characteristic of the band gap reference circuit BGR2, based on the relationship that ΔVptat2/ΔVref2 is constant.

Thus, by using the reference voltage Vrl1 outputted from the temperature sensor module THS1 whose temperature characteristic is tested in advance, it is possible to test the temperature characteristics of the band gap reference circuit BGR2.

Similarly, since the reference voltage Vrh1 is common between the digital voltage signal D_ref2_rh1 of the reference voltage Vrh1 with reference to the reference voltage Vref2 and the digital voltage signal D_ref1_rh1 of the reference voltage Vrh1 with reference to the reference voltage Vref1, the difference between the digital voltage signal D_ref2_rh1 and the digital voltage signal D_ref1_rh1 holds the following equation (3).

$$D\_ref2\_rh1 - D\_ref1\_rh1 = D\_\Delta ref2 - D\_\Delta ref1 \quad (3)$$

As described above, the right side of Equation (3) is the digital value of ΔVref2−ΔVref1.

Therefore, the following equation (4) holds.

$$\Delta Vref2 - \Delta Vref1 \approx D\_ref2\_rh1 - D\_ref1\_rh1 \quad (4)$$

Since ΔVref1 is known, by deforming equation (4), ΔVref2 can be obtained.

$$\Delta Vref2 \approx D\_ref2\_rl1 - D\_ref1\_rl1 + \Delta Vref1$$

Therefore, from the relationship that ΔVptat2/ΔVref2=is constant, ΔVptat2 can be obtained as an eigenvalue showing the temperature characteristic of the band gap reference circuit BGR2

Thus, even by using the reference voltage Vrh1 outputted from the temperature sensor module THS1 whose temperature characteristic is tested in advance, it is possible to test the temperature characteristic of the band gap reference circuit BGR2.

Incidentally, ΔVptat2 may be determined using any one of the reference voltages Vrl1 and Vrh1 outputted from the temperature sensor module THS1 whose temperature characteristic is tested in advance. However, it is preferable to determine ΔVptat2 by using the average value of ΔVref2 calculated from both the reference voltages Vrl1 and Vrh1.

Figure 13:
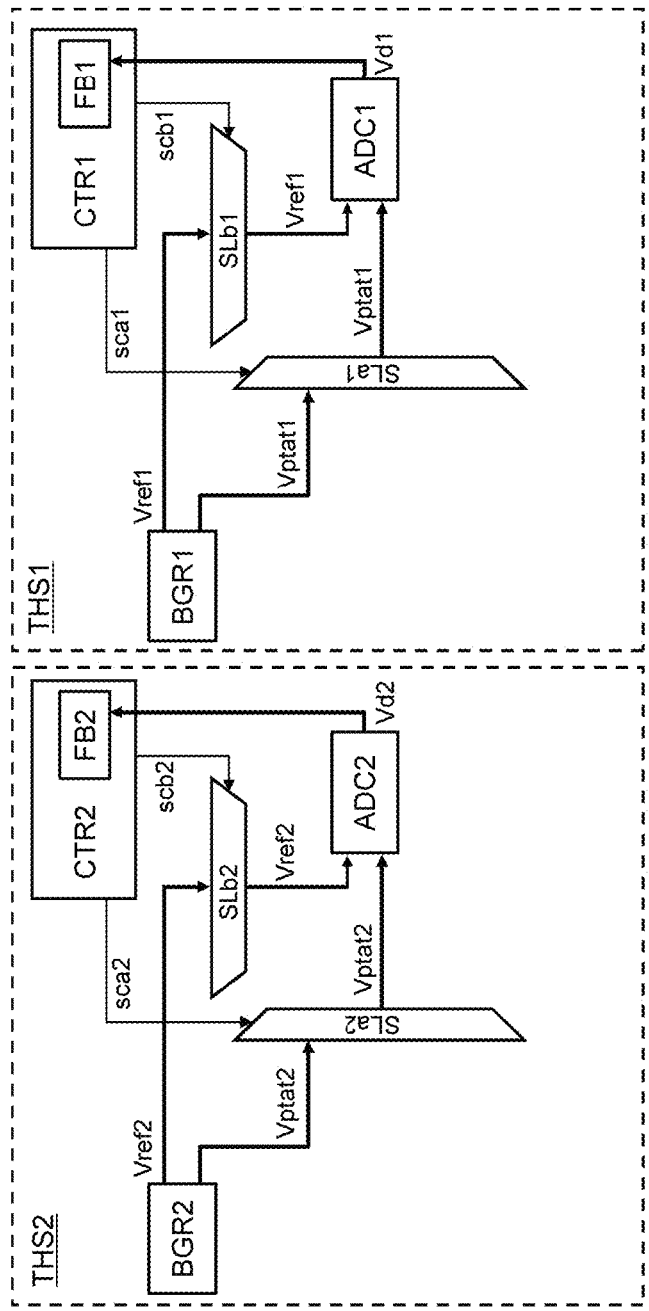
FIG. 13 is a circuit diagram showing an exemplary circuit configuration of the temperature sensor modules THS1, THS2.

Here, FIG. 13 is a circuit diagram showing an exemplary circuit configuration of the temperature sensor modules THS1 and THS2. FIG. 13 shows how the absolute temperature proportional voltages Vptat1 and Vptat2 outputted from the band gap reference circuits BGR1 and BGR2 whose temperature characteristics are tested in advance are A/D converted.

As shown in FIG. 13, the absolute temperature proportional voltage Vptat1 outputted from the band gap reference circuit BGR1 whose temperature characteristic is tested in advance is inputted to the A/D converter ADC1 via the selector SLa1. In the A/D converter ADC1, the absolute temperature proportional voltage Vptat1 is converted to the digital voltage signal Vd1 by the reference voltage Vref1 inputted via the selector SLb1 as a reference signal. The digital voltage signal Vd1 is stored in the fuse bit FB1.

Similarly, the absolute temperature proportional voltage Vptat2 outputted from the band gap reference circuit BGR2 whose temperature characteristic is tested in advance is inputted to the A/D converter ADC2 via the selector SLa2.

In the A/D converter ADC2, the absolute temperature proportional voltage Vptat2 is converted to the digital voltage signal Vd2 by the reference voltage Vref2 inputted via the selector SLb2 as a reference signal. The digital voltage signal Vd2 is stored in the fuse bit FB2.

(Method for Determining Aging Degradation)

Figure 14:
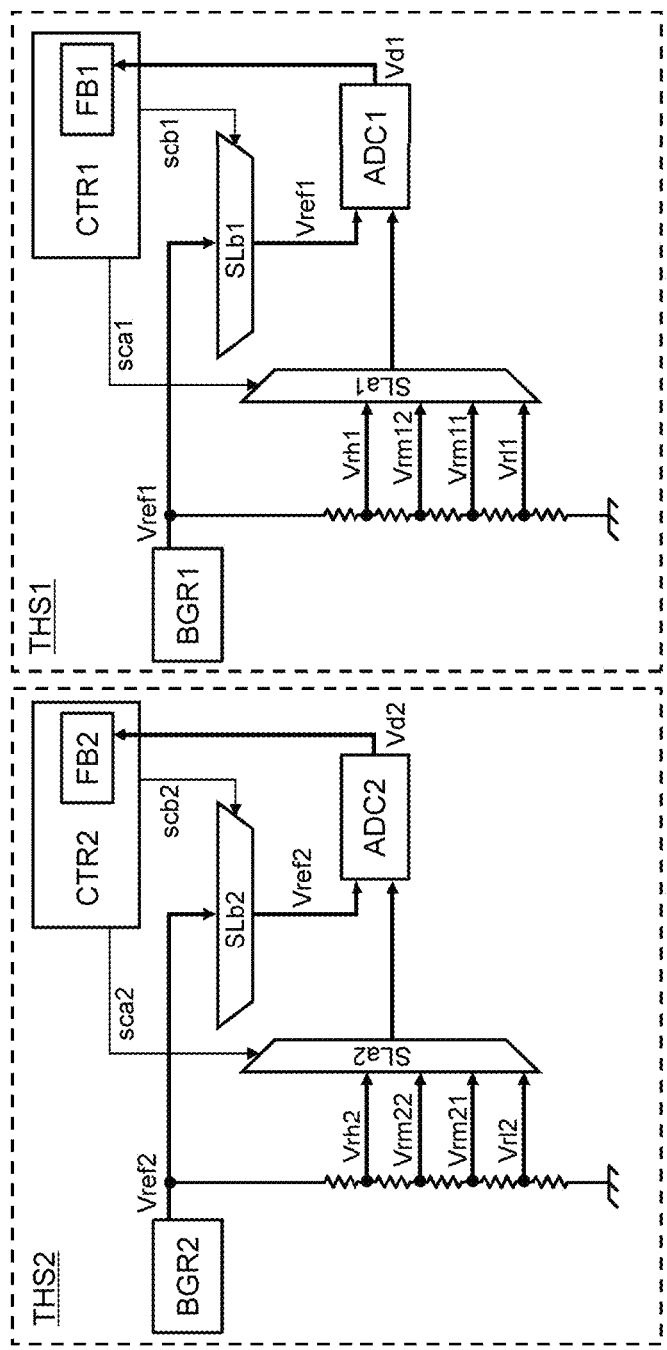
FIG. 14 is a circuit diagram showing an exemplary circuit configuration of the temperature sensor modules THS1, THS2.

Next, referring to FIG. 14, a method for determining aging degradation in the temperature sensor modules THS1 and THS2 whose temperature characteristics are tested in advance will be described. FIG. 14 is a circuit diagram showing an exemplary circuit configuration of the temperature sensor modules THS1 and THS2. In FIG. 14, among the signals shown in FIG. 11, only the signals used in determining the aging degradation of the temperature sensor modules THS1 and THS2 are shown. For example, the operation for determining the aging degradation is executed every time the semiconductor device 200 is activated.

As shown in FIG. 14, in the temperature sensor module THS1, the reference voltages Vrl1, Vrm11, Vrm12 and Vrh1 obtained by dividing the reference voltage Vref1 by the ladder resistor is inputted to the A/D converter ADC1 via the selector SLa1. In the A/D convertor ADC1, the reference voltages Vrl1, Vrm11, Vrm12 and Vrh1 are converted to the digital voltage signals Vd1 by the reference voltage Vref1 inputted via the selector SLb1 as a reference signal. The digital voltage signals Vd1 are stored in the fuse bit FB1.

Similarly, in the temperature sensor module THS2, the reference voltages Vrl2, Vrm21, Vrm22 and Vrh2 obtained by dividing the reference voltage Vref2 by the ladder resistor are inputted to the A/D converter ADC2 via the selector SLa2. In the A/D convertor ADC2, the reference voltages Vrl2, Vrm21, Vrm22 and Vrh2 are converted to digital voltage signals Vd2 by the reference voltage Vref2 inputted via the selector SLb2 as a reference signal. The digital voltage signals Vd2 are stored in the fuse bit FB2.

Figure 15:
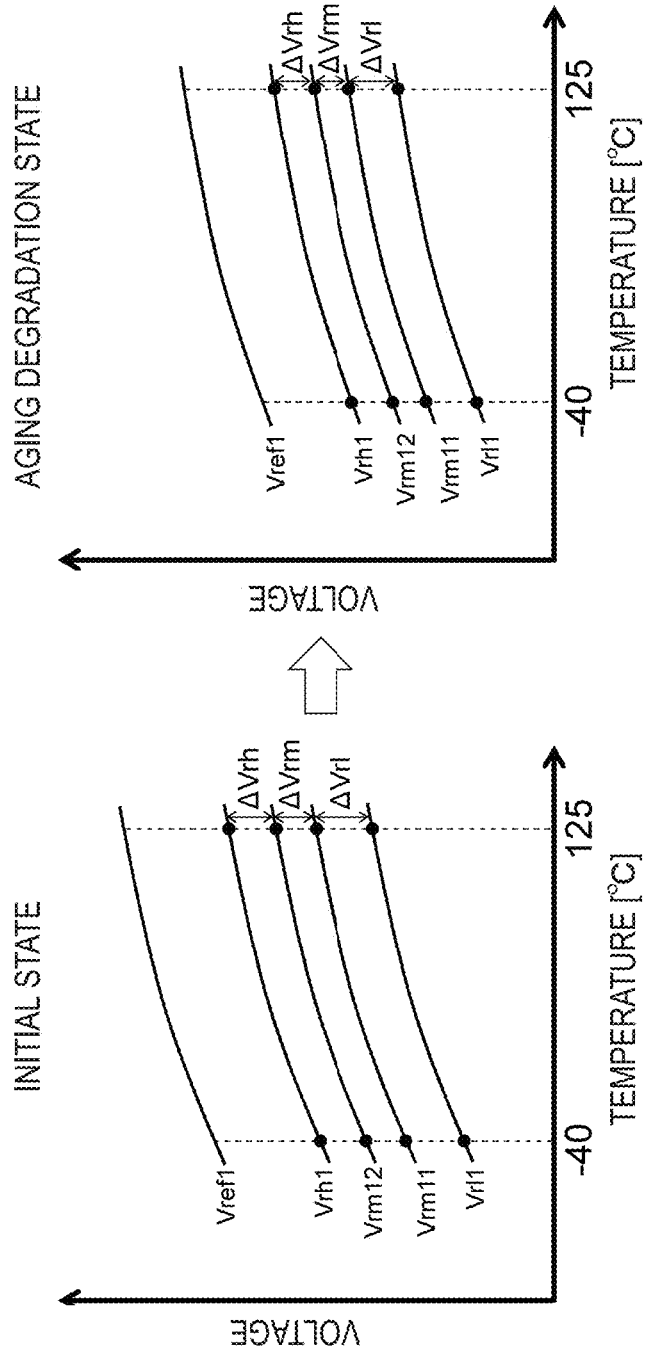
FIG. 15 is a graph schematically showing an aging degradation in the temperature sensor module THS1.
Figure 16:
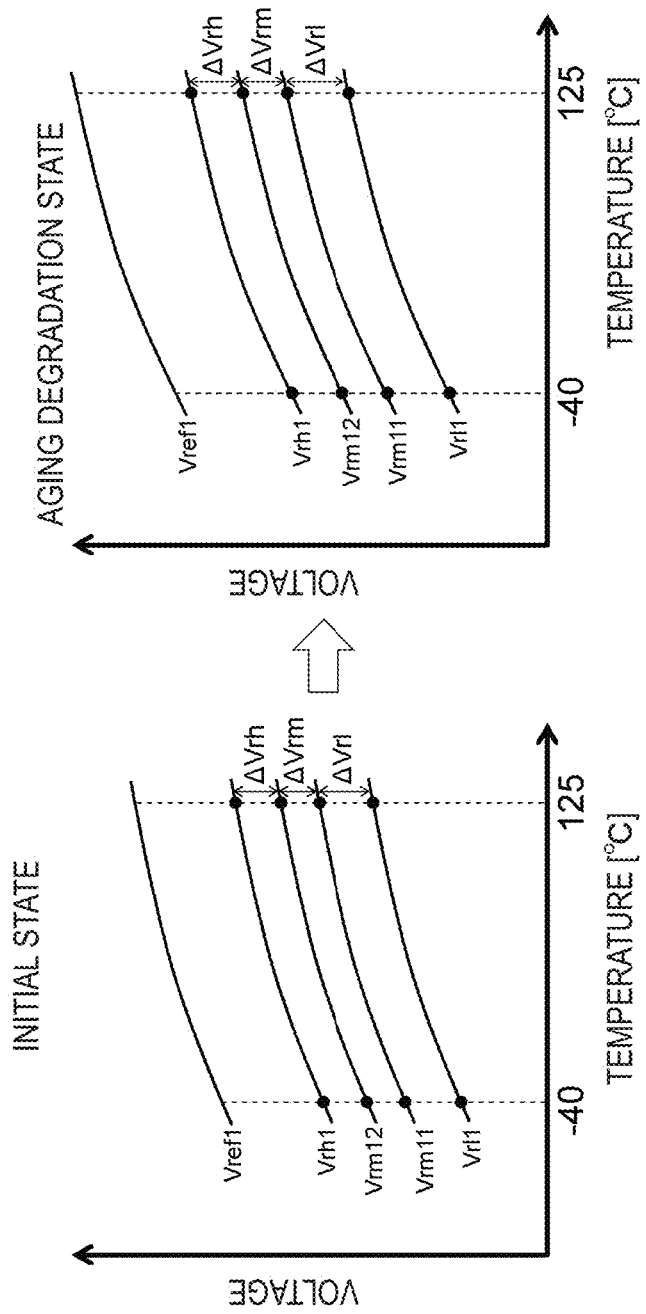
FIG. 16 is a graph schematically showing the aging degradation in the temperature sensor module THS1.

Here, FIGS. 15 and 16 are graphs schematically showing aging degradation in the temperature sensor module THS1.

In each of FIGS. 15 and 16, the two graphs show the initial state and the aging degradation state. In both graphs, the horizontal axis indicates the temperature (° C.), the vertical axis indicates the voltage. In both graphs, the reference voltages Vrl1, Vrm11, Vrm12, Vrh1 and Vref1 are shown.

In FIGS. 15 and 16, a difference ΔVrl between the reference voltage Vrl1 and the reference voltage Vrm11, a difference ΔVrm between the reference voltage Vrm11 and the reference voltage Vrm12, and a difference ΔVrh between the reference voltage Vrm12 and the reference voltage Vrh1 are shown. the controller CTR1 calculates the reference voltage differences ΔVrl, ΔVrm, ΔVrh, for example, by using the digital values of the reference voltages Vrl1, Vrm11, Vrm12 and Vrh1 stored in the fuse bit FB1. The reference voltage differences ΔVrl, ΔVrm, ΔVrh may be stored in the fuse bit FB1.

As shown in FIGS. 15 and 16, the aging degradation causes changes in the reference voltage differences ΔVrl, ΔVrm, ΔVrh.

In FIG. 15, the aging degradation causes increases in the reference voltage differences ΔVrl, ΔVrm, ΔVrh. On the other hand, in FIG. 16, the aging degradation causes decreases in the reference voltage differences ΔVrl, ΔVrm, ΔVrh.

As shown in FIGS. 15 and 16, the aging degradation may cause increases or decreases in the reference voltage differences ΔVrl, ΔVrm and ΔVrh. Therefore, for example, when the amount of change in the reference voltage differences ΔVrl, ΔVrm and ΔVrh from the initial value exceed predetermined threshold values, the controller CTR1 determines that the controller CTR1 itself is in aging degradation state.

As described above, in the semiconductor device 200 according to the present embodiment, the aging degradation can be determined based on the amount of changes in the difference ΔVrl, ΔVrm and ΔVrh, of the reference voltages Vrl1, Vrm11, Vrm12, Vrh1.

Similarly, the aging degradation can be determined for the temperature sensor modules THS2 to THS4.

In Patent Document 2, it is necessary to separately provide a temperature sensor module for determining the aging degradation in the vicinity of the temperature sensor module. However, in the semiconductor device 200 according to the present embodiment, that is not needed.

Also, the aging degradation rates of the temperature sensor modules THS1 and THS2 formed in the same power supply area PD1 are similar. In contrast, the aging degradation rates of the temperature sensor modules THS3 and THS4 formed in the different power supply areas PD2 and PD3, are different since the power supply voltage and voltage application time are different.

In such a case, in Patent Document 2, a temperature sensor module for determining the aging degradation is required to provide for each power supply areas PD1, PD2, PD3.

In contrast, in the semiconductor device 200 according to the present embodiment, the temperature sensor modules THS1 to THS4 can determine the aging degradation. Therefore, the temperature sensor modules THS3 and THS4 formed in the different power supply areas PD2 and PD3 can also determine the aging degradation appropriately.

The aging degradation may be determined using any of the reference voltage differences ΔVrl, ΔVrm and ΔVrh. Further, for example, the aging degradation may be determined using the difference between the reference voltages Vrl1 and Vrh1.

The program described above includes a group of instructions (or software code) for causing a computer to perform one or more of the functions described in the embodiment when loaded into the computer. The program may be stored on a non-temporary computer-readable medium or on a tangible storage medium. By way of illustration, but not limitation, computer-readable or tangible storage media may include RAM(Random-Access Memory), ROM(Read-Only Memory, flash memory, SSD(Solid-State Drive), or other memory technologies, CD-ROM, DVD(Digital Versatile Disc), Blu-ray disks or other optical disk storage, magnetic cassettes, magnetic tapes, magnetic disk storage, or other magnetic storage devices. The program may be transmitted on a temporary computer readable medium or communication medium. By way of example and not limitation, a temporary computer readable medium or communication medium includes an electrically, optically, acoustically, or other type of propagating signal.

Although the invention made by the inventor has been specifically described based on the embodiment, the present invention is not limited to the embodiment already described, and it is needless to say that various modifications can be made without departing from the gist thereof.

What is claimed is:

1. A temperature characteristic test method for a semiconductor device comprising a band gap reference circuit for outputting a reference voltage and an absolute temperature proportional voltage, the method comprising:
   before testing a temperature characteristic of the band gap reference circuit, measuring temperature dependencies of the reference voltage and the absolute temperature proportional voltage for a plurality of samples; and
   calculating a first difference between the reference voltage of the band gap reference circuit at a predetermined temperature and a median value of the reference voltages of the plurality of samples;
   calculating a second difference between the absolute temperature proportional voltage of the band gap reference circuit at the predetermined temperature and a median value of the absolute temperature proportional voltages of the plurality of samples; and
   testing the temperature characteristic based on the first difference and the second difference.

2. The temperature characteristic test method according to claim 1,
   when testing the temperature characteristic, a ratio of the first difference and the second difference is constant regardless of temperature.

3. The temperature characteristic test method according to claim 1,
   when testing the temperature characteristics, a lower limit temperature and an upper limit of operation guarantee temperature are set to the semiconductor device, and
   the second difference is calculated based on an average value of the first difference at the lower limit temperature and the first difference at the upper limit temperature.

4. The temperature characteristic test method according to claim 1,
   wherein an aging degradation is determined based on an amount of change in a difference between a plurality of reference divided voltages obtained by dividing the reference voltage outputted from the band gap reference circuit of which the temperature characteristic is measured.

5. The temperature characteristic test method according to claim 4,
   wherein the band gap reference circuit is a first band gap reference circuit, and outputs a first reference voltage as the reference voltage,
   wherein the semiconductor device further comprising a second band gap reference circuit for outputting a second reference voltage formed in a different power supply region from the first band gap reference circuit, and
   wherein the aging degradation is determined based on an amount of change in a difference between a plurality of reference divided voltages obtained by dividing the second reference voltage outputted from the second band gap reference circuit of which a temperature characteristic is measured.

6. The temperature characteristic test method according to claim 1,
   wherein the band gap reference circuit is a first band gap reference circuit, and outputs a first reference voltage as the reference voltage,
   when testing a temperature characteristic of a second band gap reference circuit for outputting a second reference voltage,
   dividing the first reference voltage outputted from the first band gap reference circuit of which the temperature characteristic is measured into a first reference divided voltage,
   converting the first reference divided voltage to a first digital signal by the first reference voltage as a reference in a first A/D converter, converting the first reference divided voltage to a second digital signal by the second reference voltage as a reference in a second A/D converter, and testing the temperature characteristic of the second band gap reference circuit based on a difference between the first digital signal and the second digital signal.

* * * * *